Patented Aug. 7, 1934

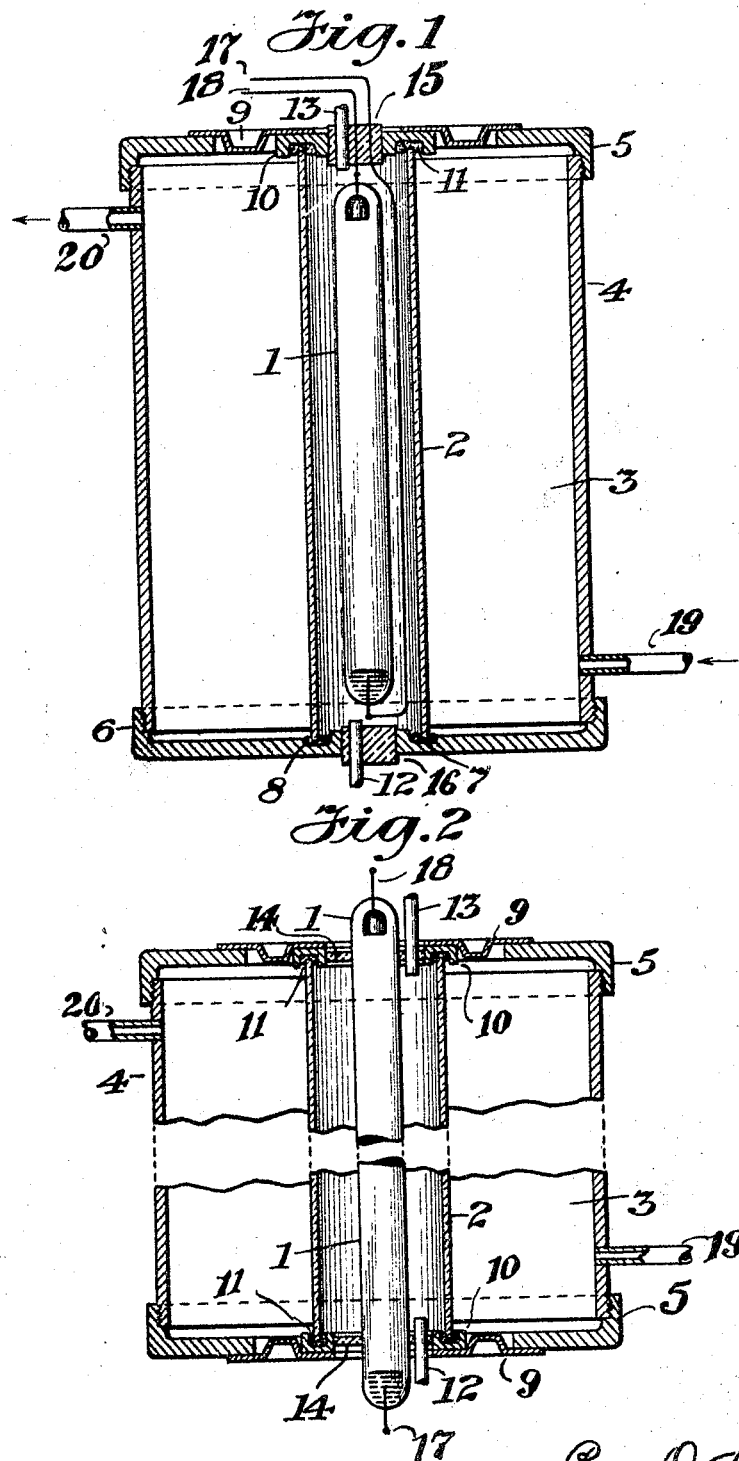

1,969,655

UNITED STATES PATENT OFFICE 1,969,655

REACTION CHAMBER

Roy D. Mailey, East Orange, N. J., assignor to General Electric Vapor Lamp Company, a corporation of New Jersey Application September 27, 1923, Serial No. 665,242
Renewed March 23, 1934

8 Claims. (Cl. 23—252)

The present invention relates to methods of and apparatus for the carrying on of chemical action or reaction under the influence of actinic light including ultra violet light and relates particularly to apparatus in which the desired rays are caused to pass to a reaction chamber through a screen of gas which is transparent to such rays. This invention can also be applied in the arts generally as by flooding such a transparent gas through a chamber in which are a source of the desired light rays and material being subjected to such light rays, the transparent gas being either neutral or beneficial to the effect of the light on the material subjected thereto.

It is well recognized that certain wave-lengths react more strongly to produce a reaction than other wave-lengths. And it is believed by some that some wave-lengths inhibit certain reactions. By surrounding the radiant energy source with gaseous screens that transmit the whole range of energy or that may selectively absorb certain forms of radiant energy, that is certain wave-lengths, we are in a position to control the nature of and the extent of certain chemical reactions.

I have discovered that certain gases are transparent to short wave ultra violet light among which are hydrogen, nitrogen, helium and argon. I, therefore, according to my invention, increase the efficiency in the use of actinic light in connection with chemical reactions and the like by so arranging the apparatus that the radiation passed from the source to the substance irradiated shall be through one of the transparent or selective gases.

Particularly effective in affecting, assisting, effecting, or accelerating chemical actions are wave-lengths from those of the blue up to the shortest ultra-violet, inclusive. When I find that light of a certain wave-length or lengths is of value for effecting or affecting a certain reaction and light of other wave-lengths is not desired I use as a screen between the source of radiant energy and the substance to be subjected thereto a gas that will filter out all but the desired wave length or lengths. Likewise when within a given range I find that light of a certain wave-length is not desired or is undesirable for certain purposes I use as a screen between the source and the substance a fluid, a gas, or a mixture of fluids or gases that selectively absorbs said undesirable wave lengths and passes nothing but light of the wave length or lengths desired.

For the walls of apparatus in which my invention is used and through which ultra-violet light as well as any other light might be passed I use fused quartz or fused fluorite. For the purpose of illustrating my invention I describe its use particularly with ultra-violet light up to and including the shortest wave lengths.

I contemplate the use of an annular chamber formed about the exterior of the tube of an ultra-violet arc lamp similar in form to a Liebig condenser jacket. For this purpose I prefer a joint between the light tube and the outer chamber which will not be broken through expansion due to temperature changes or other causes.

This result I obtain by providing a gas chamber having one of its walls in common with the reaction chamber. This common wall, of course, is of material such as fused quartz or silica, or fused fluorite which is transparent to the desired light waves, including those of the far ultra violet. In the gas or vacuum chamber I provide a source of light rich in ultra violet rays. The shapes of the light-containing chamber and the reaction chamber are determined by the particular case in which used and by the nature of the reactions, temperatures, and so on. For some uses I provide a light chamber with a plurality of transparent walls in common with a different reaction chamber in which are conducted various or different reactions or different steps in the same or a series of reactions. Where the nature of the reaction or reactions involved or the scale of operation requires it, the light chamber is built within or suspended within the reaction chamber, a plurality of light chambers being used when proper distribution of the light requires. In each case the light chamber is an evacuated one or one containing or through which is passed a gas which is transparent to the far ultra violet waves or which is otherwise beneficial to the effect of the light passed therethrough on the reaction desired.

In the drawing I have shown reaction chambers which are annular in form with the gas or light chamber in the center thereof. In this drawing Figure 1 is a vertical section of an annular chamber in the cylindrical space at the center of which a source of light rich in ultra violet rays is completely enclosed.

Figure 2 is a vertical section of an annular reaction chamber with a light source extending through the center chamber.

In Figure 1 of the drawing is shown the mercury vapor arc lamp 1 having an envelope of fused silica or of fused fluorite. This lamp as a source of ultra violet light including the far ultra violet is suspended within the circular tube 2 which to be transparent to the ultra violet waves is also made either of fused silica or of fused fluorite. About the tube 2 is the tube 4 the interior 3 of which bounded by tubes 2 and 4, and by caps at each end forms a chamber for chemical reactions. The annular cap 6 is fixed to tube 4 and has near its inner circumference an annular channel 8 in which is seated one end of the tube 2, the annular sealing gasket 7 set in channel 8 serving to seal the joint between the cap 6 and tube 2. The annular cap 5 is fixed to the other end of tube 4 and is through the expansion ring 9 fixed to the sealing cap 10. The other end of tube 2 is seated on a gasket 11 which is set in an annular channel in the cap 10. In the opening of the cap 10 is the closure 15 through which pass the conduit pipe 13, and the electric supply mains 17 and 18 of the lamp 1. In the central opening of the cap 6 is the closure 16 through which passes the conduit pipe 12. The chamber 3 is provided with the entrant and exit tubes 19 and 20, each of which is provided with means for controlling the flow, not shown but well known in the art.

Figure 2 shows a modification of the reaction chamber of Figure 1 in which the lamp 1 extends through the closures 14 and 14 in the central openings of the rings 10. These closures are provided with conduit pipes 12 and 13 respectively. This figure shows both caps 5 of tube 4 as having expansion rings 9 between the cap and the seating member 10 of the ends of tube 2.

In the operation of my apparatus the lamp is supplied with power through mains 17 and 18. To provide a path transparent to ultra violet light including the far ultra violet rays the space in tube 2 or the inner chamber between said tube and the envelope of the lamp 1 is evacuated through pipes 12 and 13, or there is passed through the tube 2 by means of pipes 12 and 13 a stream of gas transparent to such light. For some purposes tube 2 is emptied of gases opaque to such light and a gas selectively transparent to the desired rays and selectively absorbent to the undesired rays as described above is passed through or held in the chamber by suitable regulative controls on pipes 12 and 13. The substances of the chemical reaction are held in space 3 of tube 4. If they be fluids, granules or powders they are in some cases passed into the chamber and held there during the reaction or they may be caused to flow therethrough during the reaction by means of conduits 19 and 20, such a process being continuous.

In place of the simple type of tube as shown by 1, a vacuum jacketed type of tube may be substituted therein in those cases where it is desired to avoid delterious reaction between the gas and the hot walls of the lamp.

For the selective gaseous screens I use such gases, or mixtures of gases as air, oxygen, ozone, chlorine, bromine, water vapor, and various mixtures of these, such as chlorine-bromine mixture, at atmospheric pressure, or above or below atmospheric, as desired.

I claim as my invention:—

1. In combination with a reaction chamber having a wall transparent to ultra violet light, a source of light rich in ultra violet rays situated outside said reaction chamber and within a selective atmosphere premeable to a preponderance of light of desired wave lengths and absorbent to a preponderance of undesired wave lengths, and means for circulating said atmosphere past said transparent wall.

2. In combination, an annular reaction chamber having an inner wall transparent to ultra violet light, an inner chamber bounded by said wall, a source of light in said inner chamber rich in ultra violet rays, a selective atmosphere permeable to a preponderance of light of desired wave lengths and absorbent to a preponderance of undesired wave lengths, and means for circulating said atmosphere through said chamber.

3. In combination, an annular treating chamber having an inner wall transparent to ultra-violet light, an inner chamber bounded by said wall and provided with spaced inlet and outlet openings, a source of light in said inner chamber rich in ultra-violet rays, a fluid medium permeable to a preponderance of light of desired wave lengths from said source filling said inner chamber, said fluid medium being absorbent to a preponderance of undesired wave lengths from said source, and means including said openings for passing said fluid medium through said inner chamber.

4. In combination, a treating chamber having a wall transparent to ultra-violet light, a source of light rich in ultra-violet rays and having an envelope wall transparent to such rays, the walls of said treating chamber and of said source forming walls of an intermediate chamber, a gaseous medium permeable to a preponderance of light of the wave lengths suitable for said treating chamber filling said intermediate chamber, said gaseous medium being absorbent to a preponderance of undesired wave lengths from said source, and means for passing said gaseous medium through said intermediate chamber.

5. The process of producing or accelerating chemical reactions comprising subjecting the reaction substances to ultra-violet light while circulating between said substances and the source of ultra-violet light a selective atmosphere permeable to a preponderance of ultra-violet light of desired wave lengths and absorbent to a preponderance of ultra-violet light of undesired wave lengths.

6. In combination with a treating chamber having a wall transparent to ultra-violet light, a source of light rich in ultra-violet rays, said source having an envelope wall transparent to such rays and situated outside said treating chamber and within a fluid medium permeable to a preponderance of light of desired wave lengths from said source and absorbent to a preponderance of undesired wave lengths from said source, means including the transparent walls of said treating chamber and of said source to form an intermediate chamber, said fluid medium filling said intermediate chamber, and means for passing said fluid medium into and out of said intermediate chamber.

7. In combination with an annular treating chamber having an inner wall transparent to ultra-violet light, an inner chamber bounded by said wall and provided with spaced inlet and outlet openings, a source of light in said inner chamber rich in ultra-violet rays, a selective screening medium permeable to a preponderance of light of desired wave lengths and absorbent to a preponderance of light of undesired wave lengths filling said inner chamber and means including said openings for passing said screening medium through said inner chamber.

8. The process of producing or accelerating chemical reactions comprising subjecting the reaction substances to ultra-violet light while circulating between said substances and the source of ultra-violet light a selective atmosphere containing oxygen, the said atmosphere being permeable to a preponderance of ultra-violet light of desired wave lengths and absorbent to a preponderance of ultra-violet light of undesired wave lengths.

ROY D. MAILEY.